United States Patent
Primos, Jr. et al.

[11] Patent Number: 5,803,785
[45] Date of Patent: Sep. 8, 1998

[54] GAME CALL APPARATUS WITH A SELECTIVE DISABLEMENT MODE

[75] Inventors: James A. Primos, Jr., Madison; Wilbur R. Primos, Jackson, both of Miss.

[73] Assignee: Primos, Inc., Jackson, Miss.

[21] Appl. No.: 859,422

[22] Filed: May 20, 1997

[51] Int. Cl.⁶ .................................................. A63H 5/00
[52] U.S. Cl. ..................... 446/207; 446/188; 446/197
[58] Field of Search ........................... 446/193, 204–206, 446/207–208, 188, 197, 397

[56] References Cited

U.S. PATENT DOCUMENTS

| | | | |
|---|---|---|---|
| 2,782,558 | 2/1957 | Harley | 46/180 |
| 2,969,611 | 1/1961 | Warren | 46/180 |
| 3,583,094 | 6/1971 | Tribell | 46/178 |
| 3,811,221 | 5/1974 | Wilt | 46/180 |
| 3,815,283 | 6/1974 | Piper | 46/178 |
| 3,968,592 | 7/1976 | Piper | 446/193 |
| 4,048,750 | 9/1977 | Wolfe | 46/180 |
| 4,050,186 | 9/1977 | Shultz | 46/180 |
| 4,335,539 | 6/1982 | Jones | 46/179 |
| 4,551,112 | 11/1985 | Johnson | 446/207 |
| 4,576,584 | 3/1986 | Hill | 446/193 |
| 4,950,198 | 8/1990 | Repko, Jr. | 446/207 |
| 4,976,648 | 12/1990 | Meline | 446/207 |
| 5,360,413 | 11/1994 | Leason et al. | 604/249 |
| 5,549,498 | 8/1996 | Kirby | 446/193 |
| 5,593,054 | 1/1997 | Glynn | 215/225 |
| 5,735,725 | 4/1998 | Primos | 446/207 |

OTHER PUBLICATIONS

Page 17 from 1997 Primos catalog showing "Terminator" mouthpiece assembly and mouthpiece cap.

*Primary Examiner*—Robert A. Hafer
*Assistant Examiner*—Laura Fossum
*Attorney, Agent, or Firm*—Foster & Foster

[57] ABSTRACT

A game call is disclosed which includes a bell, a sound generator in communication with the bell, a bellows in communication with the sound generator, and a cap removably attached to the bell to substantially prevent the game call from sounding while the cap is attached to the bell and to prevent debris from entering the game call. To facilitate attachment of the cap to the bell, a groove is formed on the cap interior surface, the groove being sized to interlock with a lip formed on the bell exterior surface to provide a secure interlocking relationship between the cap and the bell. A cap tether which effectively couples the call to the game call is provided to prevent the cap from being lost or misplaced while not attached to the bell.

29 Claims, 3 Drawing Sheets

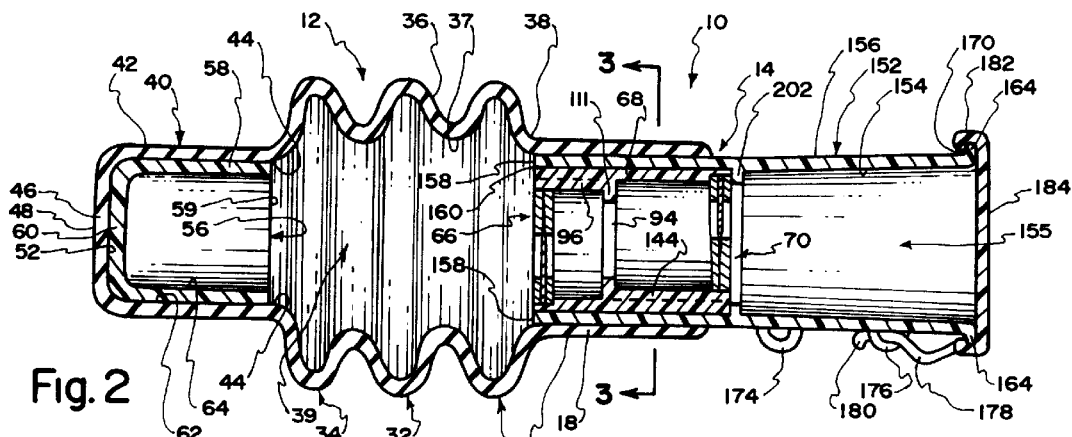
Fig. 2
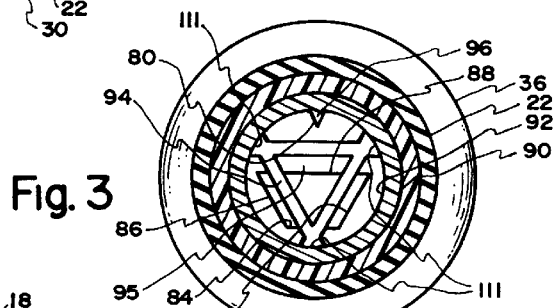
Fig. 3
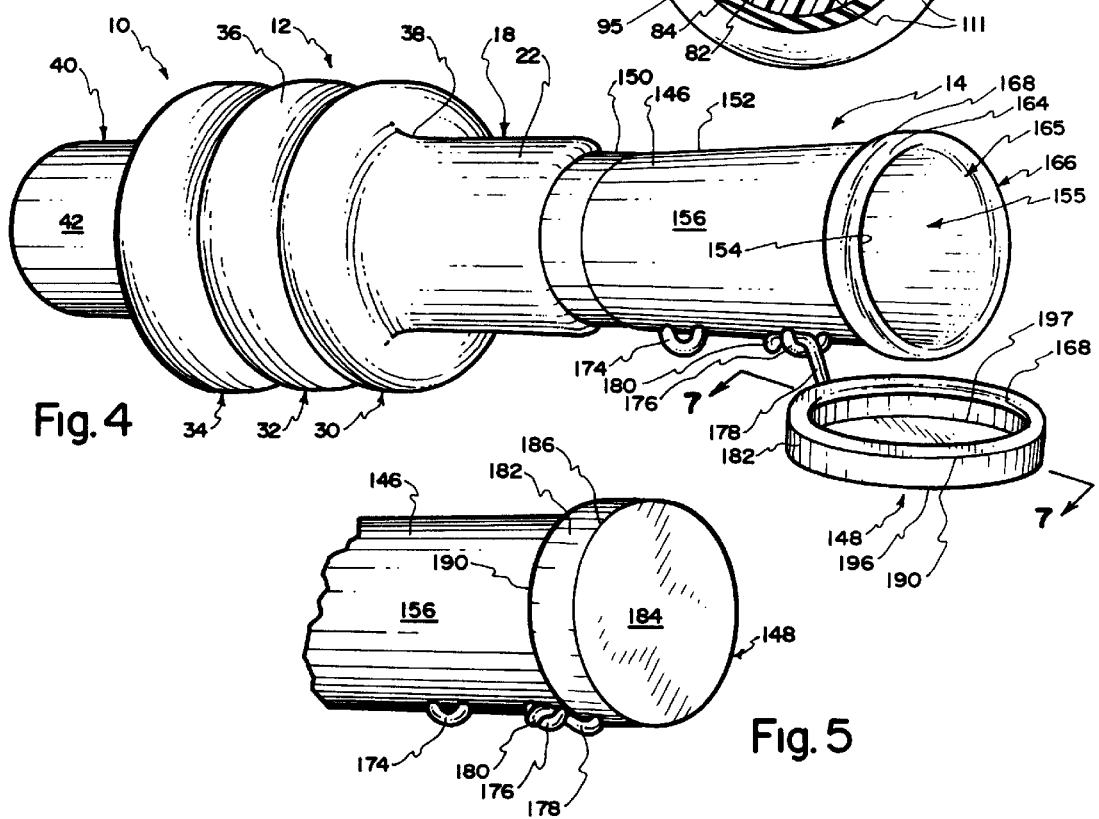
Fig. 4
Fig. 5

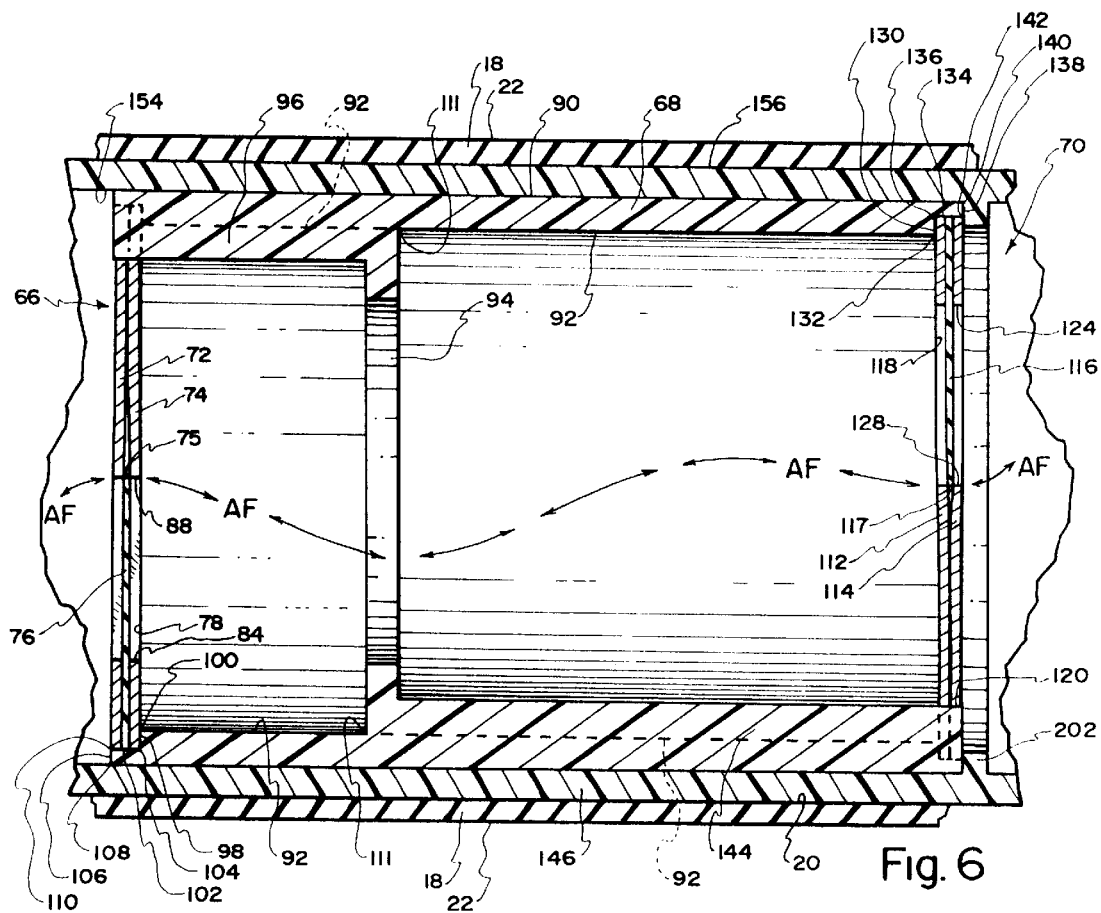
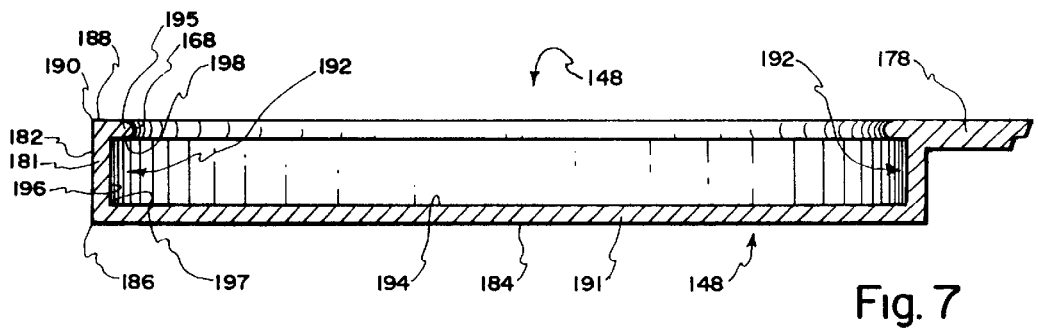

GAME CALL APPARATUS WITH A SELECTIVE DISABLEMENT MODE

TECHNICAL FIELD

This invention relates to wildlife game calls, and more particularly, to game call devices for selectively simulating the calls of wild animals, such as the wild turkey, and that can be selectively disabled.

BACKGROUND OF THE INVENTION

Many types of wild life game calls have been developed for simulating the sound of wild game. For example, in-mouth diaphragm game calls have been developed which typically are completely inserted inside a person's mouth for calling game. A wide variety of other conventional game calls are out-of-mouth calls actuated by the user blowing into the call. Moreover, especially for wild turkey hunting, a number of friction-actuated calls have been developed. These calls generate sounds similar to those of a wild turkey by rubbing elements of the call against each other such that the friction creates the desired sounds. Additionally, shaker-type game calls have been developed which permit a user to call game by shaking the call so that one part of the call moves relative to another part of the call to produce wildlife sounds. The shaker-type game calls have been found to be particularly effective in calling wild turkeys.

Conventional shaker-type game calls typically comprise a flexible middle section, often referred to as a bellows section. The bellows section is in communication with a sound generator which, in turn, communicates with a bell. This type of game call is operated by shaking the call so that the flexible bellows alternately collapses and expands causing air flow through the sound generator. Specifically, the change in bellows internal volume due to the alternate collapsing and expanding of the bellows forces air through the sound generator. As air is forced through the sound generator, the sound generator produces a sound which simulates the sound of wild game.

Conventional shaker-type game calls have, however, a number of problems and limitations. For example, a significant problem associated with conventional shaker-type game calls is that they inadvertently create sounds when not intended by the user. Such sounds are often caused when the bellows is inadvertently collapsed or expanded. The inadvertent collapse or expansion of the bellows can be easily caused in a number of ways, such as by shaking, bumping, or dropping the game call. Since a hunter may suspend these types of calls from his or her neck or waist using a lanyard, the call will swing back and forth while walking, at which time inadvertent sounds can be produced. These calls may also be placed inside a hunter's coat pocket, vest pocket, or day pack, during which time the call may be bumped while walking, (e.g., with an elbow), or may be compressed and/or bumped while sitting which may cause the call to sound inadvertently.

The creation of inadvertent game sounds and similar noises while hunting can be highly problematic for a number of reasons. First, sounds inadvertently produced by the shaker-type game call may alert wildlife animals in the hunter's vicinity to the hunter's presence before the hunter is ready for interaction with the wildlife animals. This is especially a problem while walking or moving. The sound and movement together considerably add to possibility of being mistaken for wildlife. Secondly, and perhaps more importantly, other hunters who hear these inadvertent wild game calls may mistake the hunter for wild game, thus creating a potentially unsafe situation for the hunter making inadvertent game calls. In hunting wild turkeys, for example, where quick reflexes and instinctive shooting of firearms is required, inadvertent game call sounds may prove extremely dangerous to the hunter carrying the call.

An additional problem associated with conventional shaker-type game calls is that debris and other foreign substances frequently enter the open end of the bell. Such debris may take the form of dirt, small stones, twigs, pine needles, and the like. These foreign materials can work their way into the sound generator and may undesirably distort the sound produced by the game call, or damage the internal game call components, or both.

In view of the foregoing, there is a need to develop a shaker-type game call apparatus that allows the hunter to use the game call in its normal call mode and selectively place the game call in a disabled mode to prevent unwanted, inadvertent game calls from being produced. There is a further need to develop a shaker-type game call apparatus that allows the user to conveniently and selectively place the game call in an enabled mode for use in producing wild game calls, such as wild turkey calls. Another need exists with respect to providing a shaker-type game call which includes a cover to prevent debris from entering into the call while the call is not in use.

SUMMARY AND OBJECTS OF THE INVENTION

It is an object of the invention to provide a game call apparatus that allows a user to selectively disable the game call to prevent unwanted or inadvertent sounds from being generated by the game call.

Another object of the invention is to provide a game call apparatus that can be carried while not in use without the risk of generating inadvertent game calls.

Still another object of the invention is to provide a game call apparatus with a selectively attachable cap which, while attached, disables the game call.

Another object of the invention is to provide a game call apparatus which includes a cover for the bell portion of the call to prevent debris from entering the call interior while the call is not in use.

Yet another object of the invention is to provide a game call apparatus that is conveniently and selectively disabled.

The foregoing objects are achieved by a game call apparatus that includes a bellows section, a sound generator section in communication with the bellows section, and a bell section in communication with the sound generator section. A cap is removably attached to the bell section to substantially prevent the game call from producing sounds while the cap is attached to the bell. The removable cap also prevents debris from entering into the bell section of the game call while the game call is not in use.

Other objects, features, and advantages of the invention will become apparent from the following detailed description of the invention with reference to the accompanying drawings.

BRIEF DESCRIPTION OF THE DRAWINGS

Preferred embodiments of the invention are described below with reference to the accompanying drawings:

FIG. 2 is a sectional side elevation view of the game call apparatus of FIG. 1 in assembled condition with the cap positioned over the end of the bell;

FIG. 3 is a sectional front view taken along the lines 3—3 of the game call apparatus of FIG. 2;

FIG. 4 is an isometric view of the game call apparatus of FIG. 1 illustrated in an assembled condition;

FIG. 5 is a isometric view of the end of the bell with the cap attached to the bell;

FIG. 6 is an enlarged sectional side elevation view of the sound generator assembly taken along the lines 6—6 of the game call apparatus of FIG. 3; and FIG. 7 is an enlarged sectional side elevation view of the cap taken along the lines 7—7 of the game call apparatus of FIG. 4.

DETAILED DESCRIPTION OF THE INVENTION

Figure 1:
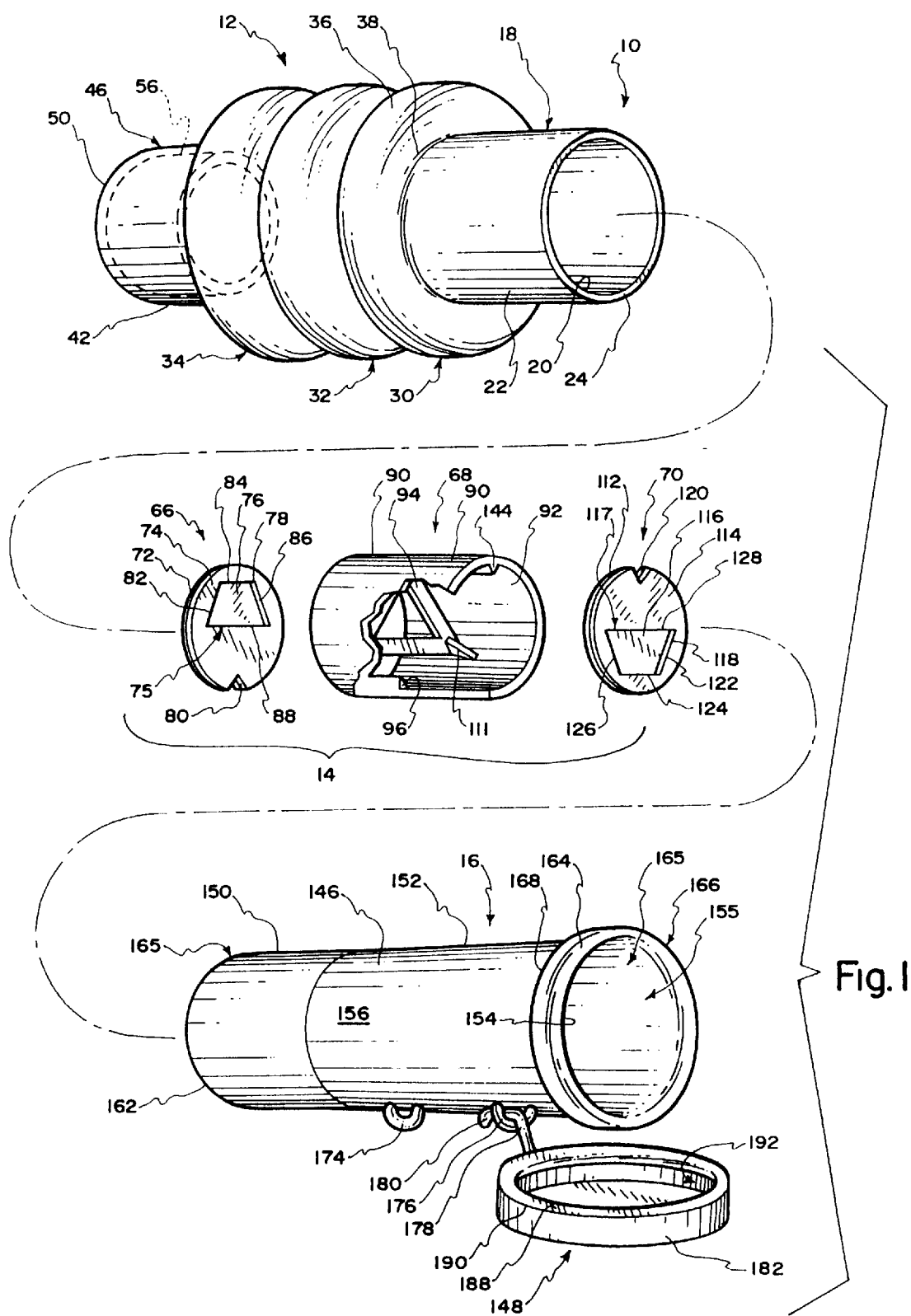
FIG. 1 is an exploded isometric view of a game call apparatus according to the present invention.

References is now made to the drawings where like numerals are used to designate like parts throughout. The term "distal" is used to refer to something closer to the open end of the game call. Conversely, the term "proximal" refers to something closer to the closed end of the game call. Specifically, FIGS. 1–7 show an embodiment of a game call apparatus 10 according to the present invention. The game call apparatus 10 is shown as generally comprising a flexible tubular bellows 12, a sound generator assembly 14, and bell assembly 16.

The bellows section 12 is formed of rubber or any other suitable elastomeric material. The bellows 12 comprises an open-ended cylindrical extension 18 which comprises a cylindrical interior surface 20 and a cylindrical exterior surface 22. A transverse outer edge surface 24 extends from the cylindrical extension exterior surface 22 to the interior surface 20.

A series of three undulations 30, 32, and 34 comprise the tubular bellows section 12 adjacent to the cylindrical extension 18. While the bellows section 12 is illustrated as having comprising a series of three undulations of substantially the same size, a bellows with differently sized undulations, a different number of undulations, or no undulations at all may also be employed. As illustrated, the exterior surface 36 of the undulations 30, 32, and 34 intersects with the exterior surface 22 of the cylindrical extension 18 at a rounded annular corner 38. The undulations interior surface 37 defines a bellows hollow interior 39.

The bellows 12 further comprises a cylindrical closed end portion 40 formed adjacent to undulation 34. The cylindrical closed end portion 40 comprises a cylindrical exterior surface 42 and a cylindrical interior surface 44. The cylindrical closed end portion 40 terminates at a circular end wall 46. Similarly, the closed end exterior surface 42 is interconnected to a circular wall exterior surface 48. Likewise, the closed end interior surface 44 intersects with circular wall interior surface 52.

A weight 56 is positioned in the cylindrical closed end portion 40 of the bellows 12 to facilitate operation of the game call 10. The operation of the game call 10 will be described subsequently in more detail. The weight 56 is illustrated as comprising a cylindrical wall 58 having an open end 59 and a closed circular end wall 60. The cylindrical wall 58 further comprises an exterior surface 62 and an interior surface 64. While the weight 56 is shown as being secured within the closed end portion 40 by a friction or interference fit, the exterior surface 62 of the weighted article 56 may also be effectively adhered, or otherwise secured within, the closed end portion 40 of the bellows 12. Further, while the weight is shown as being tubular in shape with a closed end, it is to be understood that any weight device may be used to carry out the present invention.

The sound generator assembly 14 (FIGS. 1, 2, 6, and 7) is illustrated as generally comprising a first diaphragm assembly 66, a cylindrical housing 68, and a second diaphragm assembly 70. As discussed in more detail below, when air passes through the sound generator assembly 14, a variety of game-like sounds can be produced.

As shown in FIGS. 1 and 6, the first diaphragm assembly 66 comprises a first proximal plate 72, a first distal plate 74, and a first flexible diaphragm 76. The distal plate 74 comprises a thin circular plate comprising a polygonal window 78 and an alignment notch 80. The distal plate 74 may be formed of aluminum, steel, plastic, or any other suitable material. The proximal plate 72 is preferably identical in structure to the distal plate 74. Accordingly, no further description of the proximal plate 72 is necessary.

A first flexible diaphragm 76 is secured between the proximal plate 72 and distal plate 74 so as to substantially cover the polygonal window 78. The diaphragm is stretched to a particular tension during the assembly process to enable the proper game sounds to be generated. The flexible diaphragm 76 may be formed of latex or other suitable material. The first proximal plate 72, the first distal plate 74, and the first flexible diaphragm 76 are secured together in the configuration illustrated in FIGS. 1, 2, and 6 by adhesion. When assembled, the first diaphragm assembly 66 permits air to flow through the polygonal window 78 over a free edge 75 of the flexible diaphragm.

To enable air to pass across the free edge 75 of the flexible diaphragm 76 through the window 78, the flexible diaphragm 76 is attached to the distal plate 74 along window edges 82, 84, and 86 so that the free edge 75 is aligned with and corresponds to the window edge 88. Thus, air passing to and from the bellows 12 may pass through the window 78 between the free edge 75 of the flexible diaphragm 76 and the window edge 88. As air passes across the flexible diaphragm 76, the flexible diaphragm vibrates to produce sounds similar to wild game.

The first diaphragm assembly 66 is positioned within a cylindrical housing 68. The cylindrical housing 68 generally comprises an exterior surface 90, an interior surface 92, and a support structure 94 mounted on the interior surface 92. While the cylindrical housing 68 may be formed of a variety of suitable materials, in a presently preferred embodiment, the housing 68 is formed of plastic.

A V-shaped ridge 96 (FIGS. 1 and 6) is also formed on and extends above the interior surface 92 (see the hidden line reference 92 in FIG. 6). The V-shaped ridge 96 is shaped and sized to interlock with a corresponding notch 80 formed in the distal plate 74. The interlocking relationship between the notch 80 and the ridge 96 assists in orienting and securing the distal plate 74 within the housing 68.

As shown, the proximal end of the cylindrical housing interior surface 92 intersects with transverse surface 98 at annular shoulder 100. The transverse surface 98 also intersects an extension surface 102 at annular corner 104. The inside diameter of the extension surface 102 is slightly less than the outside diameter of the first diaphragm assembly 66 such that an interference fit is created between the two members. The cylindrical housing 68 terminates, at its proximal end, at blunt edge surface 106. The blunt edge surface 106 intersects the cylindrical exterior surface 90 at annular corner 108. Similarly, the edge surface 106 intersects the extension surface 102 at annular corner 110.

As mentioned, the first diaphragm assembly 66 is positioned within the cylindrical housing extension surface 102 by an interference fit. Specifically, proximal plate 72 and distal plate 74 are pressed into the position illustrated in FIGS. 2 and 6. The notch 80 is aligned and interlocked with the V-shaped ridge 96 to assure proper alignment of the first diaphragm assembly 66 within the cylindrical housing 68. While the first diaphragm assembly 66 is illustrated as being positioned within the cylindrical housing 68 by an interference fit, the first diaphragm assembly 66 may likewise be secured within the cylindrical housing 68 by adhesion.

An internal structural support member 94 (FIGS. 1, 3, and 6) is illustrated as being positioned approximately one-third of the distance between the first diaphragm assembly 66 and the second diaphragm assembly 70. The structural support member 94 is generally triangularly shaped, has an open middle section 95, and is secured to the cylindrical housing interior surface 92 at three mounting locations 111.

The second diaphragm assembly 70 is structurally identical to the first diaphragm assembly 66, with the exception that the second assembly 70 is mounted in the sound generator assembly 14 rotated 180° relative to the first diaphragm assembly 66. Specifically, the second diaphragm assembly 70 comprises a second proximal plate 112, a second distal plate 114, a second flexible diaphragm 116, a diaphragm free edge 117, a second polygonal window 118, a second alignment notch 120, window edges 122, 124, 126, and 128. The proximal plate 112, distal plate 114, flexible diaphragm 116, polygonal window 118, alignment notch 120, and window edges 122–128 are structurally identical to and configured identically as proximal plate 72, distal plate 74, flexible diaphragm 76, polygonal window 78, alignment notch 80, and window edges 82–88. The free edge 117 of the diaphragm is aligned with and corresponds to the window edge 128 such that air flows between the free edge 117 and window edge 128 upon operation of the call. Because of the structural similarities between diaphragm assembly 66 and 70, no further structural description of the second diaphragm assembly 70 is needed.

On the end of the cylindrical housing 68 opposite the first diaphragm assembly 66, the interior surface 92 of the cylindrical housing 68 intersects with a transverse surface 130 at an annular shoulder 132. An extension surface 134 intersects the transverse surface 130 at annular corner 136. A blunt edge surface 138 intersects the cylindrical housing exterior surface 90 at annular corner 140 and intersects the extension surface 134 at annular corner 142.

A V-shaped ridge 144 is formed on and extends above the cylindrical housing interior surface 92. The V-shaped ridge 144 is sized and shaped to interlock with the notch 120 formed in the second diaphragm assembly 70. The second diaphragm assembly 70 is properly aligned and secured within the cylindrical housing 68 by aligning the notch 120 with the V-shaped ridge 144. The V-shaped ridge 144 is formed on the interior surface 92 opposite and laterally offset from the ridge 96. The orientation of the V-shaped ridges 92 rnd 144 allow the first and second diaphragm assemblies 66 and 70, respectively, to be positioned in the air passageway 180° opposite one another.

With notch 120 aligned with the V-shaped ridge 144, the second diaphragm assembly 70 is secured within the cylindrical housing 68 by positioning the plates 112 and 114 in an interference fit, similar to that described above with respect to the first diaphragm assembly, with the extension surface 134. While illustrated as being secured by an interference fit, the second diaphragm assembly 70 may also be effectively secured within, the cylindrical housing 68 by adhesion or any other suitable securement means.

The bell assembly 16 (FIGS. 1, 2, and 4) generally comprises a bell 146 and a cap 148. The bell 146 is illustrated as comprising a cylindrical portion 150 and a flared portion 152. While the bell 146 may be formed of any suitable material, in a presently preferred embodiment, the bell 146 is formed of plastic.

The bell 146 further comprises an interior surface 154 and an exterior surface 156 (see FIG. 2). The bell interior surface 154 defines a hollow, substantially cylindrical interior 155 and intersects, at one end, a transverse edge 158 at an annular corner 160. Likewise, the exterior surface 156 of the bell 146 intersects the transverse surface 158 at annular corner 162. An annular lip or ridge 164 is formed on the outlet end of the bell which defines an outlet opening 165. The lip 164 comprises a substantially hemispherical exterior surface 168 which intersects with the bell exterior surface 156 at annular corner 170 (FIG. 2).

A pair of arch-shaped anchor locations 174 and 176 are illustrated in FIGS. 1, 2, 4, and 5 as being formed on the bell exterior surface 156. Anchor location 174 may be used to conveniently secure a lanyard (not shown) to the gaine call 10. Anchor location 176 is illustrated as receiving a tether 178 attached to the cap 148 to ensure that the cap does not separate from the bell 146. The cap tether 178 comprises an enlarged bulb 180 formed on one end of the tether to prevent disconnection of the tether 178 from the anchor location 176. The other end of the tether is attached to a peripheral edge surface 182 of the cap 148. The cap 148 may, however, be effectively coupled to the bell 146 any suitable means. Coupling the cap 148 to the bell 146 prevents the cap 148 from being misplaced or lost when the cap 148 is not secured to the bell distal end 166.

To substantially disable the game call 10 and to prevent debris from entering the call, the cap 148 may be secured over the distal end 166 of the bell 152 as illustrated in FIGS. 2 and 5. The cap 148 is preferably made of sanoprene rubber, but may also be made of any other suitable material. As shown in FIG. 7, the cap 148 generally comprises an annular peripheral wall 181 and a circular end wall 191. The annular peripheral wall 181 comprises an exterior surface 182 and an interior surface 196. Similarly, the circular end wall 191 comprises an exterior surface 184 and an interior surface 194. As shown, the annular wall exterior surface 182 and the circular wall exterior surface 184 intersect at an outside annular corner 186. Similarly, the circular wall interior surface 194 intersects the annular wall interior surface 196 at an inside annular corner 197.

An annular, inwardly extending flange 195 is formed on the cap adjacent to the annular peripheral wall 181. The flange 195 comprises an outside surface 188, an inside surface 198, and a curved surface 168 connecting the inside and outside surface. The outside surface 188 intersects the annular wall exterior surface at an annular corner 190. In this configuration, the interior cap surface 194, the inside peripheral wall surface 116, and the inside surface 198 of flange 195 define a channel or groove 192.

When the cap 148 is positioned on the bell distal end 166, the lip 164 seats inside the channel or groove 192, as shown in FIG. 2. Advantageously, the inside diameter of the curved surface 168 is slightly less than the outside diameter of the lip 164, which creates an interference fit when the cap 148 is installed over the bell distal end 166.

When properly assembled, as illustrated in FIG. 2, the first diaphragm assembly 66 is secured within the cylindrical housing 68 by aligning notch 80 with the V-shaped ridge 96 and securing the assembly 66 within the extension surface 102 by an interference fit. Likewise, the second diaphragm assembly 70 is secured within the cylindrical housing 68 by aligning notch 120 with the V-shaped ridge 144 and securing the assembly 70 within the extension surface 134 with an interference fit. Next, the assembled sound generator 14 is inserted into the bell proximal end 165 until the blunt edge surface 138 of the cylindrical housing 68 abuts with an annular flange 202 formed on the interior surface 154 of the cylindrical housing 68.

Once the sound generator assembly 14 is properly positioned within the bell 146, the cylindrical extension 18 of the bellows 12 is secured over the bell proximal end 165 and may be sealed, for example, to the bell exterior surface 156 by friction. An adhesive is also provided between the cylindrical extension surface 20 and the bell exterior surface 156 to further secure the bellows 12 to the bell 146.

The properly assembled game call 10 may be operated in a number of different ways. One way to operate the game call 10 is to hold, with one hand, the game call 10 around the bell exterior surface 156 with the cap 148 detached from the bell distal end 166. When the game call is vigorously shaken from side to side, a first part of the game call moves relative to a second part about the bellows 12. This back-and-forth movement causes the bellows to alternately collapse and expand, which causes, in turn, an air flow (AF) through the sound generator assembly 14 to generate the desired sound. Specifically, air passes between diaphragm free edge 75 and window edge 88 of the first diaphragm assembly 66 and between diaphragm free edge 117 and window edge 128 of the second diaphragm assembly 70. The weighted article 56 positioned in the closed end 40 causes the back-and-forth movement of one portion of the call relative to another portion of the call, which varies the volume of air inside the bellows to cause the air flow (AF).

Alternatively, the game call 10 may also be operated by removing the cap 148 from the bell distal end 166 and then firmly gripping the bell exterior surface 156 with one hand and firmly gripping the closed end portion 40 with another hand. While holding the game call 10 in the manner described, the bell 146 and the closed end portion 40 are pushed together and pulled apart in a rapid pumping motion which forces air through the sound generator assembly to create the desired sound. Advantageously, the rapid pumping activity is begun aggressively and loudly. The pumping activity is then decreased in volume and intensity to achieve a more realistic-sounding game call.

As described above, as the bellows 12 alternately collapse and expand, air is forced through the sound chamber which generates a sound simulating a sound of wild game. Thus, whenever the bellows 12 is collapsed or expanded, a gamelike sound is produced by the game call 10. As discussed above, these sounds may be made inadvertently while the hunter is simply walking through the woods. Inadvertent sounds made by the call may alert animals to the hunter's presence when the hunter is not ready for action. These Inadvertent sounds, along with the movement of the hunter, may also attract attention from other hunters who could mistake the hunter for wildlife due to the realistic nature of the sounds.

To prevent sound from being generated by the game call 10 by the inadvertent expanding or collapsing of the bellows 12, a disabled mode is achieved by attaching the cap 148 to the distal end of the bell 166. In essence, the cap 148 operates as a silencer when attached to the bell distal end 166 to effectively disable the game call 10 while the cap 148 is attached to the bell distal end 166. Thus, the game call 10 may be selectively disabled (i.e., selectively prevented from sounding) by selectively securing a bell closure, such as cap 148, to the bell distal end 166.

The cap 148 is effectively secured to the bell distal end 166 by positioning the lip 164 within the groove 192 formed in the cap interior to create an interlocking relationship between the annular lip 164 and the annular groove 192. An additional advantage of securing the cap 148 to the bell distal end 166 while the game call 10 is not in use is that the entry of debris into the game call is prevented.

In compliance with the statute, the invention has been described in language more or less specific as to structural and methodical features. It is to be understood, however, that the invention is not limited to the specific features shown and described, since the embodiments disclosed herein comprise preferred forms of putting the invention into effect. The invention is, therefore, claimed in any of its forms or modifications with the proper scope of the appended claims appropriately interpreted in accordance with the doctrine of equivalents.

We claim:

1. A game call apparatus, comprising:
    a bell having a distal end, a hollow interior, and an exterior surface;
    a sound generator in communication with the bell hollow interior, the sound generator generating a sound similar to the sound of wild game as air is passed across the sound generator as one portion of the game call moves relative to another portion of the game call and as air moves out of the bell distal end;
    a cap securable to the bell distal end to cover the bell distal end and block air from flowing outside of the game call apparatus to prevent substantially any sound generation by the game call.

2. A game call apparatus according to claim 1 wherein the bell includes an annular lip formed on the bell exterior surface at the bell distal end, the annular lip having an outside diameter greater than an unstressed inner diameter of the cap to enable an interference fit between the cap and the bell distal end.

3. A game call apparatus according to claim 1 wherein the cap is external to the bell hollow interior when attached to the bell distal end.

4. A game call apparatus according to claim 1, further comprising:
    an annular lip formed on the bell exterior surface at the bell distal end;
    the cap further comprising:
        cap interior surface;
        an annular groove formed on the cap interior surface, the annular groove adapted to permit the annular lip and annular groove to interlock upon securing the cap to the bell.

5. A game call apparatus according to claim 1 wherein the cap envelops the bell distal end.

6. A game call apparatus according to claim 1 wherein the sound generator further comprises:
    a cylindrical housing;
    at least one flexible diaphragm transversely disposed within the cylindrical housing.

7. A game call apparatus according to claim 1, further comprising a bellows in communication with the sound general or to force air across the sound generator.

8. A game call apparatus according to claim 1, further comprising a bellows in communication with the sound generator to force air across the sound generator, the bellows comprising a flexible weighted tube having a plurality of undulations.

9. A game call apparatus according to claim 1 wherein the cap is coupled with the bell exterior surface.

10. A game call apparatus according to claim 1, further comprising a cap tether having first and second ends, the tether first end being coupled to the cap and the tether second end being coupled to the bell exterior surface.

11. A game call apparatus according to claim 1 wherein the cap is formed of sanoprene rubber.

12. A game call according to claim 1, further comprising:
an annular lip having an outside diameter formed on the bell exterior surface adjacent to the bell distal end;
a cap annular interior surface;
an annular channel formed on the annular interior surface, the annular channel having an unstressed inside diameter approximately equal to the annular lip exterior surface to tightly secure the cap to the bell by positioning the annular lip at least partially within the annular channel.

13. A game call according to claim 1 wherein the cap is coupled with the bell distal end by an interference fit attachment.

14. A game call, comprising:
a first section;
a second section;
a flexible middle section interconnecting the first and second sections and permitting displacement of the first section relative to the second section;
a sound generator coupled with the second section, the sound generator generating a sound similar to the sound of wild game as air passes across the sound generator and moves outside of the game call;
an outlet opening formed on the second section;
an end cap selectively attached to the outlet opening to block air from flowing outside of the game call to prevent any substantial sound generation by the game call.

15. A game call according to claim 14 wherein the end cap envelops the outlet opening.

16. A game call according to claim 14 wherein the end cap is external to the outlet opening when attached to the outlet opening.

17. A game call according to claim 14, further comprising a tether having first and second ends, the tether first end being coupled to the end cap and the tether second end being coupled to the the second section.

18. A game call according to claim 14 wherein the flexible middle section comprises a bellows.

19. A game call according to claim 14 wherein the second section comprises a bell.

20. A game call according to claim 14 wherein the second section includes an annular lip formed on a second section exterior surface adjacent to the outlet opening formed on the second section, the annular lip having an outside diameter greater than an unstressed inner diameter of the end cap to enable an interference fit between the cap and the outlet opening.

21. A game call according to claim 14 wherein the sound generated by the sound generator is similar to the sound of wild game.

22. A game call according to claim 14 wherein the sound generator further comprises:
a cylindrical housing;
at least one flexible diaphragm transversely disposed within the cylindrical housing.

23. A method of selectively preventing a game call from producing sounds, comprising the steps of:
providing a game call comprising;
a bell having a distal end, a hollow interior, and an exterior surface;
a sound generator in communication with the bell hollow interior, the sound generator generating a sound similar to the sound of wild same as air is passed across the sound generator as one portion of the game call moves relative to another portion of the game call and as air moves out of the bell distal end;
a cap securable to the bell distal end to cover the bell distal end and block air from flowing out of the game call apparatus to prevent any substantial sound generation by the game call:
securing the cap to the bell to prevent the game call from generating substantially any sound.

24. A method according to claim 23, further comprising the steps of:
providing an annular lip having an outside diameter on the bell exterior surface adjacent to the outlet opening;
providing an annular groove formed on an interior surface of the cap,
securing the cap to the game call by interlocking the annular lip with the annular groove.

25. A method according to claim 23, further comprising the step of:
tethering the cap to the game call to prevent the cap from being misplaced while not secured to the bell distal end.

26. A selectively disabled game call apparatus, comprising:
a bell having a distal end, a hollow interior, and an exterior surface;
a sound generator in communication with the bell hollow interior;
a bellows in communication with the sound generator to force air through the sound generator to generate a sound similar to the sound of wild game;
a cap removably attached to the bell distal end to disable the game call from sounding while the cap is attached to the bell distal end by covering the bell distal end thereby blocking air from flowing outside of the game call apparatus;
a tether having first and second ends, the tether first end being coupled to the bell exterior surface and the bell second end being coupled to the cap to prevent the cap from being misplaced when detached from the bell distal end.

27. A selectively disabled game call apparatus according to claim 26 wherein the sound generator further comprises:
a cylindrical housing;
at least one flexible diaphragm transversely disposed within the cylindrical housing.

28. A selectively disabled game call apparatus according to claim 26, further comprising an annular lip formed on the bell exterior surface at the bell distal end;
the cap further comprising:
cap interior surface;
an annular groove formed on the cap interior surface, the annular groove adapted to permit the annular lip and annular groove to interlock upon securing the cap to the bell.

29. A game call, comprising:
a bell providing an exclusive exit passageway for air from inside the game call;
a sound generator coupled to the bell, the sound generator generating a sound similar to the sound of wild game upon displacement of at least two different portions of the game call relative to each other, such relative displacement causing air to pass through the bell;
a cap securable to the bell to prevent air from passing through the bell thereby disabling the call from generating substantially any sound.

* * * * *